(12) United States Patent
Kim et al.

(10) Patent No.: US 12,537,822 B2
(45) Date of Patent: Jan. 27, 2026

(54) SERVER FOR MANAGING FRIEND LIST OF PROTECTED ACCOUNT AND OPERATION METHOD OF THE SERVER

(71) Applicant: KAKAO CORP., Jeju-si (KR)

(72) Inventors: You Jin Kim, Seongnam-si (KR); Jung Woo Choi, Seongnam-si (KR); Jenog Ryeol Choi, Seongnam-si (KR); Joong Seon Kim, Seongnam-si (KR); Hong Chan Yun, Seongnam-si (KR); Ju Ho Chung, Seongnam-si (KR); Do Hyun Youn, Seongnam-si (KR); Hyung Min Kim, Seongnam-si (KR); Hyun Ok Choi, Seongnam-si (KR); Chun Ho Kim, Seongnam-si (KR); Soo Beom Kim, Seongnam-si (KR); Min Jeong Kim, Seongnam-si (KR); Chang Oh Heo, Seongnam-si (KR); Eun Soo Heo, Seongnam-si (KR)

(73) Assignee: KAKAO CORP., Jeju (KR)

( * ) Notice: Subject to any disclaimer, the term of this patent is extended or adjusted under 35 U.S.C. 154(b) by 322 days.

(21) Appl. No.: 18/307,804

(22) Filed: Apr. 27, 2023

(65) Prior Publication Data
US 2024/0080320 A1    Mar. 7, 2024

(30) Foreign Application Priority Data
Apr. 28, 2022   (KR) .......................... 10-2022-0052855

(51) Int. Cl.
*H04L 9/40*       (2022.01)
(52) U.S. Cl.
CPC ................................. *H04L 63/102* (2013.01)

(58) Field of Classification Search
CPC ...... H04L 63/102; G06Q 50/01; G06Q 50/50; G06F 3/04812; G06F 3/0482; G06F 3/04842; H04W 4/14; H04W 4/21
(Continued)

(56) References Cited

U.S. PATENT DOCUMENTS 6,763,095 B1 *   7/2004  Cermak ................. H04L 51/56
                                                 379/93.17
8,281,372 B1 * 10/2012  Vidal ................... G06Q 20/405
                                                 709/206

(Continued)

FOREIGN PATENT DOCUMENTS

JP       2015072559 A     4/2015
JP       2016527614 A     9/2016

OTHER PUBLICATIONS

"Microsoft Launches 'Xbox Family Settings App' Service for Child Management"; GameShot.net; https://www.gameshot.net/common/con_view.php?code-GA5f6d7dd90069f ; (3 pages), Sep. 25, 2020.

*Primary Examiner* — Badri Narayanan Champakesan
(74) *Attorney, Agent, or Firm* — Seed Intellectual Property Law Group LLP

(57) ABSTRACT

A server according to an embodiment includes a processor configured to receive a friend add request for a target account from a user terminal accessed with a user account; based on one of the user account and the target account being a protected account, transmit an approval request for the friend add request to a protector account connected to the protected account; and based on receiving a reply to the approval request from the protector terminal, add the target account to a friend list of the user account.

17 Claims, 11 Drawing Sheets

(58) Field of Classification Search
USPC .............................................................. 726/4
See application file for complete search history.

(56) References Cited

U.S. PATENT DOCUMENTS

| | | | |
|---|---|---|---|
| 10,003,599 B2* | 6/2018 | Shi | H04W 4/21 |
| 10,362,038 B2* | 7/2019 | Holson | H04L 63/0892 |
| 2012/0185547 A1* | 7/2012 | Hugg | H04L 51/222 |
| | | | 709/206 |
| 2014/0189807 A1* | 7/2014 | Cahill | H04L 63/0876 |
| | | | 726/4 |
| 2015/0095410 A1* | 4/2015 | Funahashi | H04L 67/5683 |
| | | | 709/203 |
| 2016/0014134 A1* | 1/2016 | Holson | H04L 67/306 |
| | | | 726/4 |
| 2016/0255078 A1* | 9/2016 | Zhang | G06F 21/36 |
| | | | 726/4 |
| 2016/0294962 A1* | 10/2016 | Andreev | H04L 67/125 |
| 2021/0110373 A1* | 4/2021 | Bhusri | G06Q 20/405 |
| 2021/0288981 A1* | 9/2021 | Numainville | H04L 63/1416 |
| 2022/0245232 A1* | 8/2022 | Mclachlan | G06F 21/44 |
| 2023/0376635 A1* | 11/2023 | Kim | G06F 3/0481 |

\* cited by examiner

SERVER FOR MANAGING FRIEND LIST OF PROTECTED ACCOUNT AND OPERATION METHOD OF THE SERVER

CROSS-REFERENCE TO RELATED APPLICATIONS

This application claims priority under 35 USC § 119(a) to Korean Patent Application No. 10-2022-0052855 filed on Apr. 28, 2022, in the Korean Intellectual Property Office, the disclosure of which is incorporated by reference herein in its entirety.

BACKGROUND

1. Field

The following description relates to a server providing an instant messaging service (IMS) and an operation method of the server.

2. Description of Related Art

The advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users. Such an increasing interaction between users via mobile devices has further allowed the online platform services to support various services based on communication between users in addition to a chat service for daily conversation with other users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an embodiment, an operation method of a server includes: receiving a friend add request for a target account from a user terminal accessed with a user account; based on one of the user account and the target account being a protected account, transmitting an approval request for the friend add request to a protector account connected to the protected account; and based on receiving an approval reply to the approval request from a protector terminal accessed with the protector account, adding the target account to a friend list of the user account.

The transmitting of the approval request may include: based on one of the user account and the target account being a protected account and the other being a general account, transmitting the approval request.

The transmitting of the approval request may include: based on one of the user account and the target account being a protected account, requesting the user terminal to display a guidance message about transmission of the approval request to the protector account; and based on receiving a confirmation reply to the guidance message from the user terminal, transmitting the approval request to the protector account.

The transmitting of the approval request may include requesting the protector terminal to display a guidance message including the approval request.

The operation method may further include: based on one of the user account and the target account being a protected account and the other being a general account, receiving, from the protector terminal, an inquiry request for searching for a profile of the other account set by the other account; and based on the received inquiry request for the profile, transmitting the profile of the other account to the protector terminal.

The transmitting of the profile may include: based on a plurality of profiles being retrieved for the other account, transmitting the plurality of profiles of the other account.

The transmitting of the approval request may include: based on the user account being a protected account, transmitting the approval request to a protector account connected to the user account.

The transmitting of the approval request may include: based on the target account being a protected account and the user account not being included in a friend list and a block list of the target account, transmitting the approval request to a protector terminal accessed with a protector account connected to the target account.

The transmitting of the approval request may include: based on the target account being a protected account and the user account being included in one of a friend list and a block list of the target account, omitting the transmitting of the approval request, and the operation method may further include adding the target account to a friend list of the user account without approval from the protector account.

The adding of the target account may include: based on the target account being a protected account, adding the user account to the friend list of the target account.

The operation method may further include: based on the target account being a protected account and based on receiving a block reply to the approval request from the protector terminal, adding the user account to the block list of the target account.

The operation method may further include: based on the user account and the target account being both a protected account, adding the target account to the friend list of the user account without approval for the friend add request.

The operation method may further include: receiving an inquiry request for searching for a friend list of the protected account from the protector terminal; and based on the inquiry request for the friend list, transmitting the friend list of the protected account to the protector terminal.

The operation method may further include: receiving, from the protector terminal, a friend add request for adding another account to the friend list of the protected account; and based on the friend add request for the other account, adding the other account to the friend list of the protected account.

The receiving of the friend add request for the other account may include: receiving, from the protector terminal, the friend add request including contacts information of the other account; and obtaining the other account corresponding to the contacts information.

The receiving of the friend add request for the other account may include: receiving the friend add request indicating, as the other account, one or more accounts among accounts included in the friend list of the protector account.

The operation method may further include: receiving, from the protector terminal, a block request for blocking one or more accounts among accounts included in the friend list of the protected account; and adding the one or more accounts indicated by the block request to a block list of the protected account.

The operation method may further include: receiving, from the protector terminal, an inquiry request for searching for the block list of the protected account; and based on the inquiry request for the block list, transmitting the block list of the protected account to the protector terminal.

The operation method may further include: receiving an unblock request from at least one of a protected terminal accessed with the protected account or the protector terminal; and based on receiving the unblock request from the protector terminal, removing an account indicated by the unblock request from the block list of the protected account.

The operation method may further include: based on receiving the unblock request from the protected terminal, requesting the protected terminal to display a guidance message about disapproval of execution of the unblock request.

According to an embodiment, an operation method of a protector terminal accessed with a protector account, the operation method includes: receiving, from a server receiving a friend add request for a target account from a user terminal accessed with a user account, an approval request for the friend add request, based on one of the user account and the target account being a protected account connected to the protector account; and transmitting a reply to the approval request to the server.

The operation method may further include: displaying a guidance message including the approval request.

The operation method may further include: based on one of the user account and the target account being a protected account and the other being a general account, transmitting, to the server, an inquiry request for searching for a profile of the other account set by the other account; and displaying the profile of the other account received from the server.

The transmitting of the reply to the approval request to the server may include: based on the target account being a protected account and based on obtaining an input corresponding to a block reply to the approval request, transmitting the block reply to the server to request adding the user account to a block list of the target account.

According to an embodiment, a server includes: a processor configured to: receive a friend add request for a target account from a user terminal accessed with a user account; based on one of the user account and the target account being a protected account, transmit an approval request for the friend add request to a protector account connected to the protected account; and based on receiving an approval reply to the approval request from a protector terminal accessed with the protector account, add the target account to a friend list of the user account.

Other features and aspects will be apparent from the following detailed description, the drawings, and the claims.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
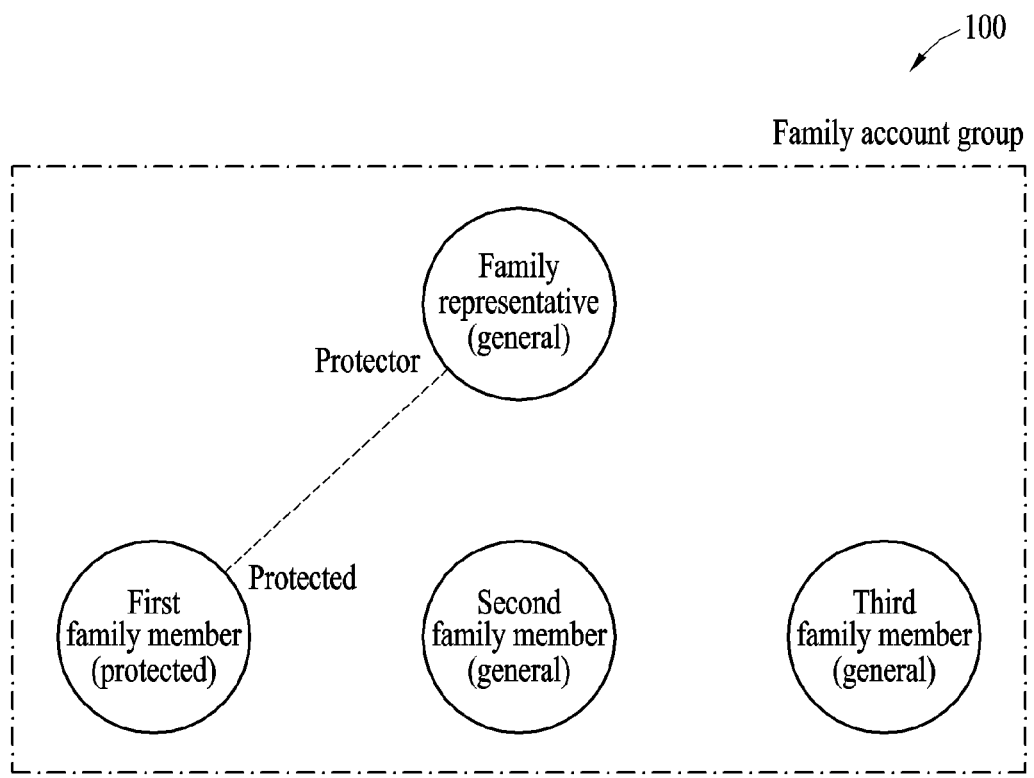
FIG. 1 illustrates an example family account group of an instant messaging service (IMS) according to an embodiment.

The following detailed structural or functional description is provided only for the purpose of providing examples, and various alterations and modifications may be made to the examples. Here, the examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as being "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the disclosure of the present application and is not to be interpreted in an idealized or overly formal sense unless expressly so defined herein.

Hereinafter, example embodiments will be described in detail with reference to the accompanying drawings. When describing the embodiments with reference to the accompanying drawings, like reference numerals refer to like components and a repeated description related thereto will be omitted.

FIG. 1 illustrates an example family account group of an instant messaging service (IMS) according to an embodiment.

According to an embodiment, a family account group 100, which is a set of one or more user accounts, may include a family representative account and a family member account. As will be described below, managing friends of a protected account which is one of family member accounts may be entrusted to the family representative account.

A user account may be generated as a user subscribes to a service (e.g., a social networking service (SNS), an IMS, or the like) provided by a server, and the server may serve as a service platform that provides the service to the user account subscribing to the service. The server may include an instant messaging server that provides an IMS.

A user terminal, which is an electronic device such as a computer, a portable computer, a wireless phone, a mobile phone, a smartphone, a personal digital assistant (PDA), a web tablet, and the like, may be a device that enables installation and execution of a service application associated with the server. In this case, the user terminal may perform overall operations of the service including, for example, configuring a service screen, inputting data, transmitting and receiving data, and storing data, under the control of the application. For example, the user terminal may access the server through the application. The user terminal may receive the service using the user account, and thus a user account described herein may be construed as substantially a user terminal.

The family representative account may be to an account that represents the family account group 100 among the user accounts belonging to the family account group 100. The family member account may be another user account (e.g., a remaining user account), excluding the family representative account, among the user accounts belonging to the family account group 100. For example, the server may generate a family account group 100 including one user account. In this example, the server may set the user account as a family representative account. For example, a terminal accessed with the family representative account may transmit, to the server, a request (e.g., a family add request) for adding a family member account to the family account group 100. The server may then add the family member account to the family account group 100 based on the family add request. The family member account may be one of a protected account and another account (e.g., a general account) that is different from the protected account.

The protected account, which is of one account type of user account, may be an account subscribed by a person who is defined by a service provider as one requiring protection or guardianship. For example, the protected account may be an account subscribed by a person with limited legal capacity (e.g., a minor under the age of 14, an adult ward, and a limited ward). The protected account may be connected to a protector account. The user terminal and/or the server may restrict a service to be provided to the protected account based on connection to the protector account.

The protector account may be an account connected to the protected account. The protector account may be selected from among user accounts each being a general account in the family account group 100. The general account, which is of one account type of user account distinguished from the protected account, may be an account subscribed by a general person (e.g., one who is not a minor, an adult ward, or a limited ward). The general account may include, for example, a protector account connected to a protected account.

For example, in a case in which at least one of family member accounts in a family account group 100 is a protected account, a family representative account may be connected as a protector account to the protected account. However, examples are not limited thereto, and another user account that is not the family representative account but is a general account may be connected as the protector account to the protected account. Also, a user terminal accessed with the family representative account may select the protector account for the protected account from among general accounts in the family account group 100.

The present specification mainly describes an example case in which the protected account is an account created by a minor under the age of 14, and the protector account is an account created by a parent of the minor. For example, the protector account may be an account created based on a subscription to an IMS by a protector or guardian (e.g., a parent), and the protected account may be an account created based on a subscription to the IMS by a protected or ward (e.g., a child). However, this example is provided only for illustrative purposes, and examples are not limited thereto.

For example, in a case of a subscription to an IMS by a first user (e.g., a child) who meets the requirements of a minor (e.g., one under the age of 14), consent of a second user (e.g., a parent) may be required to create an account of the first user. For example, the server and/or a first user terminal of the first user may request a second user terminal of the second user to consent to the creation of the account of the first user. When obtaining the consent from the second user to the creation of the account of the first user, the server may determine whether there is a family account group 100 associated with an account of the second user. In the presence of the family account group 100 (e.g., a family account group 100 that includes the account of the second user as a family representative account) associated with the account of the second user, the server may receive, from the second user terminal accessed with the account of the second user, a family add request for adding the account of the first user to the family account group 100. Based on the family add request, the server may add the account of the first user to the family account group 100. The server may receive a protector and protected connect request from the second user terminal. Based on the protector and protected connect request, the server may set the account of the first user as a protected account and the account of the second user as a protector account connected to the account of the first user.

As shown in FIG. 1, a family account group 100 may include a family representative account, an account of a first family member, an account of a second family member, and an account of a third family member. The family representative account may be a general account, the account of the first family member may be a protected account, and the respective accounts of the second family member and the third family member in the family account group 100 may each be a general account. The family representative account may be connected as a protector account to the account of the first family member which is the protected account.

There may be a probability that a protected (e.g., a user under the age of 14) using an IMS receives a message from a dangerous third party (e.g., a criminal) via the IMS. In this case, a protector may manage and/or control the use of the IMS by the protected to allow the protected to use the IMS safely.

For example, the protector may manage a friend list and/or a block list of an account of the protected (also a "protected account" herein).

The friend list of the protected account may be a list of one or more user accounts connected to the protected account as friends under the friendship. For example, transmitting a message from the protected account to a user account registered as a friend may be allowed. That is, a user account registered as a friend of the protected account may receive a message from the protected account. However, transmitting a message from the protected account to a user account that is not registered as a friend of the protected account may be restricted. As will be described below, adding a general account to the friend list of the protected account may require approval from the protector account, and thus the protected account may transmit a message only to a general account that is approved by the protector of the protector account.

The block list of the protected account may be a list of one or more user accounts from which receiving messages is blocked by the protected account. For example, the server may block a message transmitted from an account included in the block list among messages to be transmitted to the protected account. As will be described below, adding the protected account to a friend list of a general account may require approval from the protector account, and thus a user terminal accessed with the general account may transmit a message to the protected account only when it is approved by the protector of the protector account.

However, adding friends between protected accounts may not require approval from protector accounts, and thus a user terminal accessed with a protected account may register a user terminal accessed with another protected account as a friend and transmit a message to the user terminal without restriction.

Figure 2:
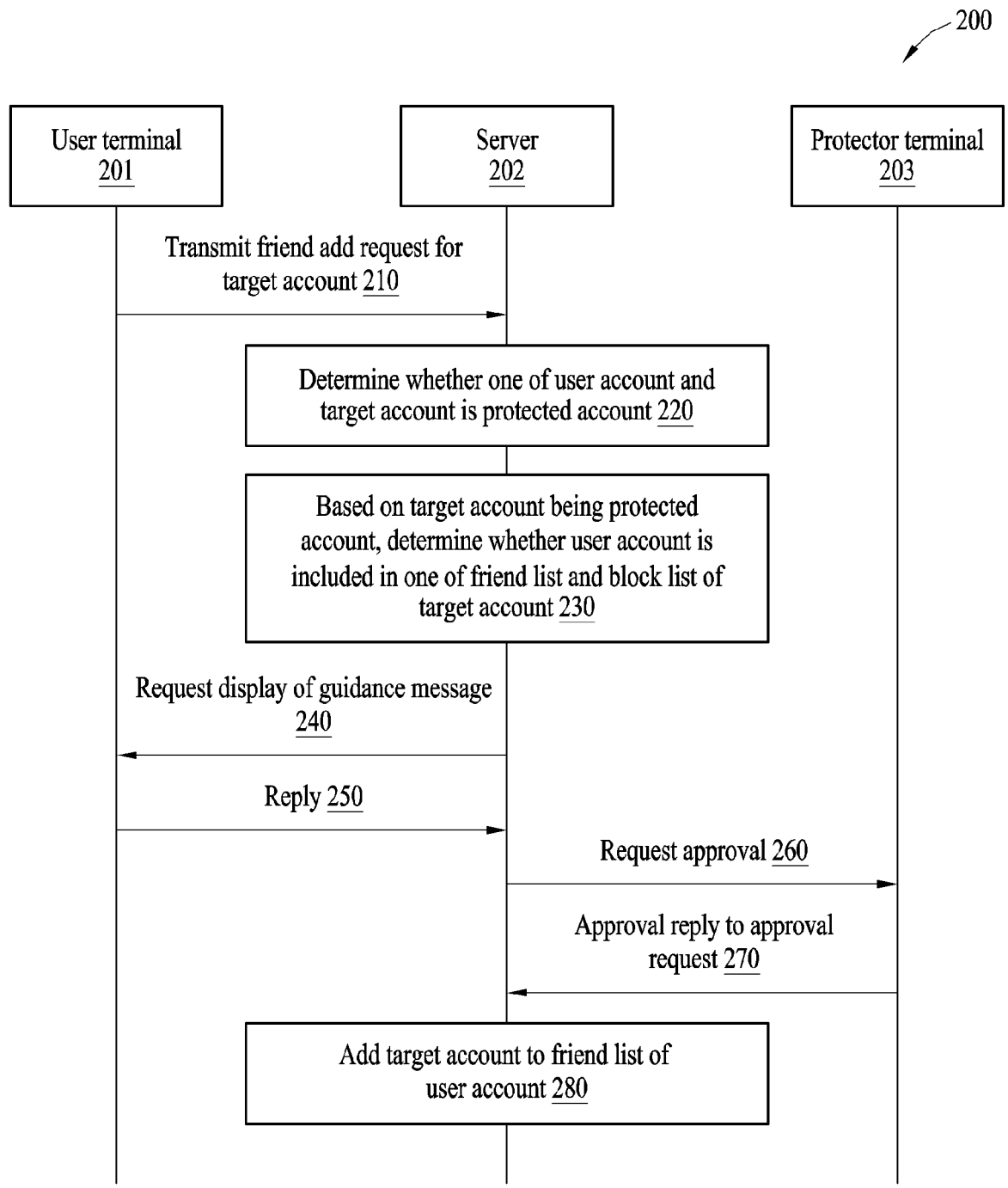
FIG. 2 illustrates an example method of adding a friend in response to a friend add request associated with a protected account according to an embodiment.

FIG. 2 illustrates an example method of adding a friend in response to a friend add request associated with a protected account according to an embodiment.

According to an embodiment, a friend adding method 200 performed by a server 202 may include operation 210 of receiving a friend add request from a user terminal 201; operation 220 of determining whether a user account and a target account are a protected account; operation 230 of, based on the target account being a protected account, determining whether the user account is included in a friend list or a block list of the target account; operation 240 of requesting the user terminal 201 to display a guidance message; operation 250 of receiving a reply to the guidance message from the user terminal 201; operation 260 of transmitting an approval request for approving the friend add request to a protector terminal 203; operation 270 of receiving a reply to the approval request from the protector terminal 203; and operation 280 of adding the target account to a friend list.

In operation 210, the user terminal 201 may transmit, to the server 202, a friend add request for a target account. The server 202 may receive the friend add request for the target account from the user terminal 201. The user terminal 201 may be a terminal accessed with a user account. The friend add request for the target account may be a request for adding the target account to a friend list of the user account.

In operation 220, the server 202 may determine whether one of the user account and the target account is a protected account. Based on the friend add request for the target account, the server 202 may determine whether one of the user account and the target account is a protected account.

According to an embodiment, the friend add request may include information (e.g., a unique number) about the user account and/or the target account. The server 202 may determine whether the user account and/or the target account is a protected account by searching a database (DB) accessible by the server 202 based on the information about the user account and/or the target account.

According to an embodiment, the friend add request may include a flag indicating whether the user account and/or the target account is a protected account. The server 202 may determine whether the user account and/or the target account is a protected account based on a flag of the friend add request.

For example, in a case of the user account being a protected account and the target account being a general account, the friend add request for the target account may be a request for adding the general account to a friend list of the protected account by a protected. Also, in a case of the user account being a general account and the target account being a protected account, the friend add request for the target account may be a request for adding the protected account to a friend list of the general account by a general person. The general person may be a user who uses a service with a general account, not with a protected account connected to a protector account. Also, in a case of the user account and the target account both being a protected account, the friend add request for the target account may be a request for adding the other protected account to a friend list of one protected account by the one protected of the one protected account.

According to an embodiment, based on the user account and the target account being a protected account, the server 202 may add the target account to the friend list of the user account. In the case of adding, as a friend, another protected account to a friend list of one protected account, the server 202 may perform it without receiving an approval reply from the protector terminal 203. In a case of the user account and the target account both being a protected account, the server 202 may add the target account to the friend list of the user account without performing (e.g., omitting) operations 230 through 270. As described herein, a protector terminal (e.g., the protector terminal 203) may be a terminal accessed with a protector account connected to a protected account that is one of the user account and the target account.

According to an embodiment, based on the user account and the target account being a general account, the server 202 may add the target account to the friend list of the user account. In a case of the user account and the target account both being a general account, the server 202 may add the target account to the friend list of the user account without performing (i.e., omitting) operations 230 through 270.

Hereinafter, a case in which one of the user account and the target account is a protected account will be mainly described.

In operation 230, based on the target account being a protected account, the server 202 may determine whether the user account is included in a friend list and a block list of the target account. Based on whether the user account is included in one of the friend list and the block list of the target account, the server 202 may determine whether to add the target account to the friend list of the user account based on receiving an approval reply from the protector terminal 203.

For example, in a case in which the user account is included in one of the friend list and the block list of the target account, the server 202 may no need to transmit an approval request and receive an approval reply to the adding of the target account to the friend list of the user account. As will be described below in relation to operation 260, based on the target account being a protected account and the user account being included in one of the friend list and the block list of the target account, the server 202 may omit to transmit the approval request. Based on the target account being a protected account and the user account being included in one of the friend list and the block list of the target account, the server 202 may add the target account to the friend list of the user account.

For another example, in a case in which the user account is not included in the friend list and the block list of the target account, the server 202 may add the target account to the friend list of the user account based on receiving an approval reply from the protector terminal 203.

According to an embodiment, based on the target account being a protected account and the user account being included in the friend list of the target account, the server 202 may add the target account to the friend list of the user account. That is, based on the target account being a protected account and the user account being included in the friend list of the target account, the server 202 may add the target account to the friend list of the user account, without performing (i.e., omitting) operations (e.g., operations 240 and 250) of transmitting a guidance message to the user terminal 201 and receiving a reply to the guidance message from the user terminal 201 and operations (e.g., operations 260 and 270) of transmitting an approval request to the protector terminal 203 and receiving a reply to the approval request from the protector terminal 203. Also, in a case in which the target account is a protected account and the user account is included in the friend list of the target account, the user account may already be added to the friend list of the target account based on an approval reply from a protector account connected to the target account. Thus, in such a case in which the target account is a protected account and the user account is included in the friend list of the target account, the server 202 may add the target account to the friend list of the user account without receiving an approval reply from the protector terminal 203.

According to an embodiment, based on the target account being a protected account and the user account being included in the block list of the target account, the server 202 may add the target account to the friend list of the user account. That is, based on the target account being a protected account and the user account being included in the block list of the target account, the server 202 may add the target account to the friend list of the user account without performing (i.e., omitting) operations (e.g., operations 240 and 250) of transmitting a guidance message to the user terminal 201 and receiving a reply to the guidance message from the user terminal 201 and operations (e.g., operations 260 and 270) of transmitting an approval request to the protector terminal 203 and receiving a reply to the approval request from the protector terminal 203. However, in this case, the user account is included in the block list of the target account, and thus it may not be possible for the user account to transmit a message to the target account via the server 202 even though the target account is added to the friend list of the user account. Thus, in a case in which the user account is included in the block list of the target account, the server 202 may add the target account to the friend list of the user account without receiving an approval reply from the protector terminal 203.

In operation 240, based on one of the user account and the target account being a protected account, the server 202 may request the user terminal 201 to display a guidance message. The guidance message may be a message about whether to transmit an approval request for approving the friend add request to a protector account. In response to this request for displaying the guidance message from the server 202, the user terminal 201 may display the guidance message. For example, the user terminal 201 may display the guidance message via a new window (e.g., in the form of a pop-up).

According to an embodiment, based on one of the user account and the target account being a protected account, the server 202 may transmit a guidance message to the user terminal 201. The user terminal 201 may then receive the guidance message from the server 202 based on one of the user account and the target account being a protected account.

According to an embodiment, the server 202 may transmit, to the user terminal 201, information indicating that one of the user account and the target account is a protected account. The user terminal 201 may then receive the information indicating that one of the user account and the target account is a protected account. Based on receiving the information indicating that one of the user account and the target account is a protected account from the server 202, the user terminal 201 may display the guidance message. The user terminal 201 may display the guidance message that is temporarily and/or permanently stored in its internal memory.

In operation 250, the user terminal 201 may transmit a reply to the guidance message to the server 202. The server 202 may then receive the reply to the guidance message from the user terminal 201. The reply to the guidance message may be one of a confirmation reply or a cancellation reply. The confirmation reply may indicate consent to transmitting an approval request to a protector account. The cancellation reply, which is a request for canceling the friend add request, may indicate rejection of transmitting an approval request to a protector account. As will be described below in relation to operation 260, based on receiving the confirmation reply to the guidance message from the user terminal 201, the server 202 may transmit the approval request for the friend add request to the protector account. Also, based on receiving the cancellation reply to the guidance message from the user terminal 201, the server 202 may not perform an additional operation for the friend add request for the target account.

In operation 260, based on one of the user account and the target account being a protected account, the server 202 may transmit an approval request for the friend add request to the protector account. Based on one of the user account and the target account being a protected account and the other being a general account, the server 202 may transmit the approval request. For example, based on the user account being a protected account, the server 202 may transmit an approval request to a protected account connected to the user account. For another example, based on the target account being a protected account, the server 202 may transmit an approval request to a protector account connected to the target account. The server 202 may request the protector terminal 203 to display a guidance message including the approval request. In response to the request for the displaying from the server 202, the protector terminal 203 may display the guidance message including the approval request. For example, the server 202 may transmit the guidance message to the protector terminal 203, and the protector terminal 203 may then output the received guidance message. For another example, the protector terminal 203 may store the guidance message in its internal memory and output the guidance message in response to the request from the server 202.

According to an embodiment, based on one of the user account and the target account being a protected account, the protector terminal 203 may receive the approval request for the friend add request from the server 202. Based on one of the user account and the target account being a protected account and the other being a general account, the protector terminal 203 may receive the approval request from the server 202. For example, based on the user account being a protected account, the protector terminal 203 accessed with a protector account connected to the user account may receive the approval request from the server 202. For another example, based on the target account being a protected account, the protector terminal 203 accessed with a protector account connected to the target account may receive the approval request from the server 202.

In addition, the protector terminal 203 may receive, from the server 202, a profile of an account involved with the approval. The account involved with the approval may include at least one of the user account or the target account. For example, in a case of the user account being a protected account, the account involved with the approval may include the target account. For another example, in a case of the target account being a protected account, the account involved with the approval may include the user account. In these examples, a protector may refer to a profile to determine one from between an approval reply and a block reply. The profile may be provided based on an inquiry request, which is distinguished from the approval request, from a protector terminal. For example, after receiving the approval request, the protector terminal 203 may transmit, to the server 202, an inquiry request for searching for a profile of at least one of the user account or the target account. Based on one of the user account and the target account being a protected account and the other being a general account, the protector terminal 203 may transmit, to the server 202, an inquiry request for searching for a profile of the other account. The server 202 may then receive, from the protector terminal 203, the inquiry request for the profile of the other account. The profile of the other account may include a profile set by the other account and stored in the server 202. For example, in a case of the user account being a protected account, the protector terminal 203 may transmit, to the server 202, an inquiry request for searching for a profile of the target account. For another example, in a case of the target account being a protected account, the protector terminal 203 may transmit, to the server 202, an inquiry request for searching for a profile of the user account. Based on the inquiry request for a profile received from the protector terminal 203, the server 202 may transmit, to the protector terminal 203, a profile of another account corresponding to the inquiry request. The protector terminal 203 may then receive the profile corresponding to the inquiry request from the server 202. The protector terminal 203 may display the received profile of the other account.

Based on retrieving a plurality of profiles for the other account in response to the inquiry request, the server 202 may transmit all the plurality of profiles of the other account. The protector terminal 203 may then receive the plurality of profiles from the server 202. The protector terminal 203 may display the plurality of profiles of the other account. For example, in a case in which the user account is a protected account and the server 202 receives an inquiry request for a profile of the target account from the protector terminal 203, the server 202 may transmit all a plurality of profiles of the target account when they are stored in the server 202. For another example, in a case in which the target account is a protected account and the server 202 receives an inquiry request for a profile of the user account from the protector terminal 203, the server 202 may transmit all a plurality of profiles of the user account when they are stored in the server 202.

However, a profile is not limited to being provided in response to an inquiry request, but an approval request may also include a profile of an account involved with approval. For example, in a case of the user account being a protected account, the approval request may include the profile of the target account. For another example, in a case of the target account being a protected account, the approval request may include the profile of the user account.

For reference, the foregoing primarily describes, but is not limited to, embodiments in which the server 202 transmits an approval request to the protector terminal 203 in a case in which the target account is a protected account and the user account is a general account. In another embodiment, the transmitting of the approval request may be omitted depending on whether the user account is included in the friend list and/or the block list of the target account. For example, based on the target account being a protected account and the user account being included in one of the friend list and the block list of the target account, the server 202 may omit to transmit the approval request. In the other embodiment, the server 202 may add the target account to the friend list of the user account without approval from a protector account. For another example, based on the target account being a protected account and the user account not being included in the friend list and the block list of the target account, the server 202 may transmit the approval request to a protector account connected to the target account. In a similar way described above, the protector terminal 203 accessed with the protector account connected to the target account may receive the approval request from the server 202.

In operation 270, the protector terminal 203 may transmit, to the server 202, an approval reply to the approval request. The server 202 may then receive the approval reply to the approval request from the protector terminal 203. A reply to the approval request described herein may include any one of an approval reply or a block reply.

The approval reply may indicate consent to a friend add request involved with a protected account by a protector. According to an embodiment, the approval reply may include a friend add request for adding one or more accounts to a friend list of a protected account. For example, in a case of the user account being a protected account, the approval reply may include a friend add request for adding the target account to the friend list of the user account that is a protected account. For another example, in a case of the target account being a protected account, the approval reply may include a friend add request for adding the user account to the friend list of the target account that is a protected account.

The block reply may indicate rejection of a friend add request involved with a protected account by a protector. According to an embodiment, the block reply may include a block request for adding one or more accounts to a block list of a protected account. For example, in a case of the user account being a protected account, the block reply may include a block request for adding the target account to the block list of the user account that is a protected account. For another example, in a case of the target account being a protected account, the block reply may include a block request for adding the user account to the block list of the target account that is a protected account.

Hereinafter, an operation performed by the server 202 when receiving the approval reply from the protector terminal 203 will be described first, and an operation performed by the server 202 when receiving the block reply from the protected terminal 203 will then be described.

In operation 280, based on receiving the approval reply to the approval request from the protector terminal 203, the server 202 may add the target account to the friend list of the user account.

For example, in a case of the user account being a protected account, based on receiving the approval reply from the protector terminal 203 accessed with a protector account connected to the user account, the server 202 may add the target account to the friend list of the user account. According to an embodiment, via an IMS, a protector may manage a friend list of a protected account such that only an account approved by the protector is added to the friend list of the protected account among accounts requesting to be added to the friend list of the protected account by a protected.

For another example, in a case of the target account being a protected account, based on receiving the approval reply from the protector terminal 203 accessed with a protector account connected to the target account, the server 202 may add the user account to the friend list of the target account and add the target account to the friend list of the user account. In particular, when adding the target account that is a protected account to the friend list of the user account, the server 202 may add the user account to the friend list of the target account, and thus the user account that adds the protected account as a friend may be included in the friend list of the protected account. The user account that may be allowed to transmit a message to the protected account may be a user account that adds the protected account as a friend and is not included in a block list of the protected account, and may thus be the same as a user account that is included in the friend list of the protected account but is not included in the block list of the protected account. Therefore, a protector may manage user accounts that may be allowed to transmit messages via the server 202 to a protected account, through a friend list and a block list of the protected account.

Although not shown in FIG. 2, according to an embodiment, the protector terminal 203 may transmit, to the server 202, the block reply to the approval request. The server 202 may then receive, from the protector terminal 203, the block reply to the approval request.

Based on receiving the block reply to the approval request from the protector terminal 203, the server 202 may add a general account to a block list of a protected account. In a case in which one of the user account and the target account is a protected account and the other account is a general account, the server 202 may add the other account to a block list of the one account.

For example, in a case of the user account being a protected account, based on receiving the block reply to the approval request from the protector terminal 203 accessed with a protector account connected to the user account, the server 202 may add the target account to the block list of the user account. When the target account is included in the block list of the user account, it may not be possible to transmit a message from the target account to the user account via the server 202.

For another example, in a case of the target account being a protected account, based on receiving the block reply from the protector terminal 203 accessed with a protector account connected to the target account, the server 202 may add the user account to the block list of the target account. When the user account is included in the block list of the target account, it may not be possible to transmit a message from the user account to the target account via the server 202.

Figure 3:
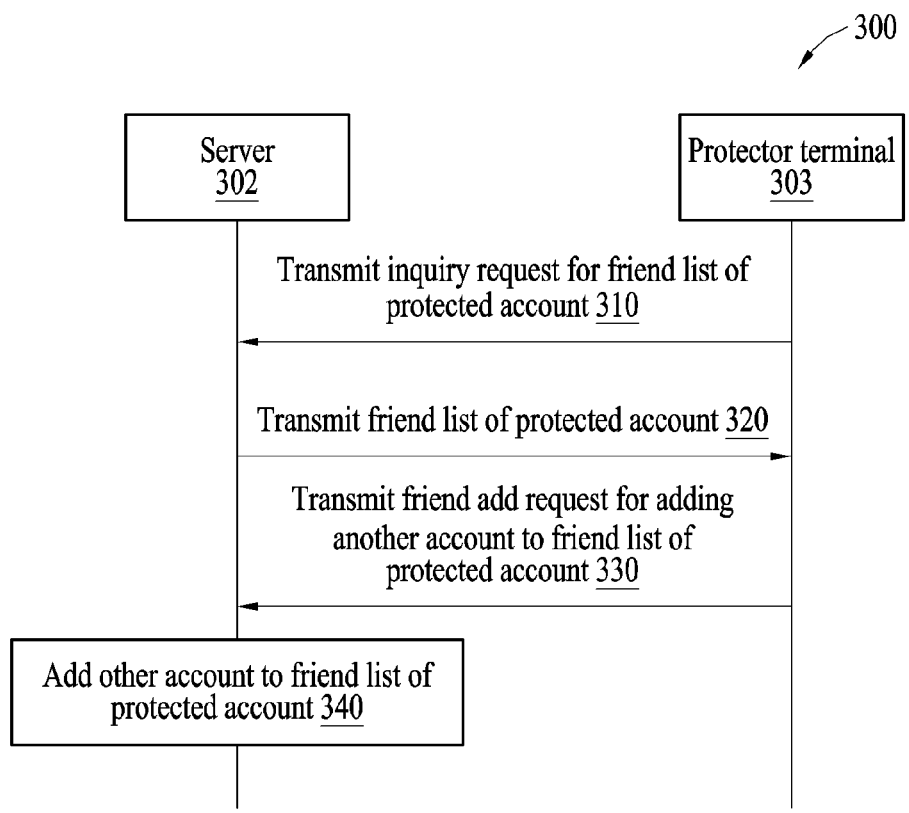
FIG. 3 illustrates an example method of adding a friend for a protected account by a protector according to an embodiment.

FIG. 3 illustrates an example method of adding a friend for a protected account by a protector according to an embodiment.

According to an embodiment, a friend adding method 300 for a protected account, performed by a server 302, may include operation 310 of receiving an inquiry request for searching for a friend list of the protected account from a protector terminal 303, operation 320 of transmitting the friend list of the protected account to the protector terminal 303, operation 330 of receiving a friend add request for another account from the protector terminal 303, and operation 340 of adding the other account to the friend list of the protected account.

In operation 310, the protector terminal 303 may transmit an inquiry request for searching for a friend list of the protected account to the server 302. The server 302 may then receive the inquiry request for the friend list of the protected account from the protector terminal 303. The inquiry request for the friend list of the protected account may be a request for obtaining the friend list of the protected account.

In operation 320, based on the inquiry request, the server 302 may transmit the friend list of the protected account to the protector terminal 303. The protector terminal 303 may then receive the friend list of the protected account from the server 302.

In operation 330, the protector terminal 303 may transmit, to the server 302, a friend add request for adding another account to the friend list of the protected account. The server 302 may then receive, from the protector terminal 303, the friend add request for adding the other account to the friend list of the protected account.

According to an embodiment, the protector terminal 303 may transmit, to the server 302, a friend add request including contacts information of a target account. The server 302 may receive, from the protector terminal 303, a friend add request including contacts information of another account. The contacts information of another account may include a phone number corresponding to a terminal corresponding to the other account. The server 302 may obtain the other account corresponding to the contacts information. For example, the server 302 may obtain the other account by searching a DB accessible by the server 302 based on the contacts information. Based on the obtained other account being included in the friend list of the protected account, the server 302 may transmit, to the protector terminal 303, a guidance message indicating that the other account is already included in the friend list of the protected account. The protector terminal 303 may receive, from the server 302, the guidance message indicating that the other account is already included in the friend list of the protected account.

According to an embodiment, the protector terminal 303 may transmit, to the server 302, an inquiry request for searching for a friend list of a protector account. The server 302 may then receive, from the protector terminal 303, the inquiry request for the friend list of the protector account. The server 302 may transmit the friend list of the protector account to the protector terminal 303. The protector terminal 303 may then receive the friend list of the protector account from the server 302. The protector terminal 303 may transmit, to the server 302, a friend add request for adding one or more of accounts included in the friend list of the protector account. The server 302 may then receive, from the protector terminal 303, the friend add request for one or more of the accounts included in the friend list of the protector account.

In operation 340, based on the friend add request for the other account, the server 302 may add the other account to the friend list of the protected account. For example, the server 302 may add an account indicated by the friend add request to the friend list of the protected account.

As described above with reference to FIG. 3, through a service provided by a server according to an embodiment, a protector may search for a friend list of a protected account connected to a protector account of the protector and add a user account selected by the protector to the friend list of the protected account.

Figure 4:
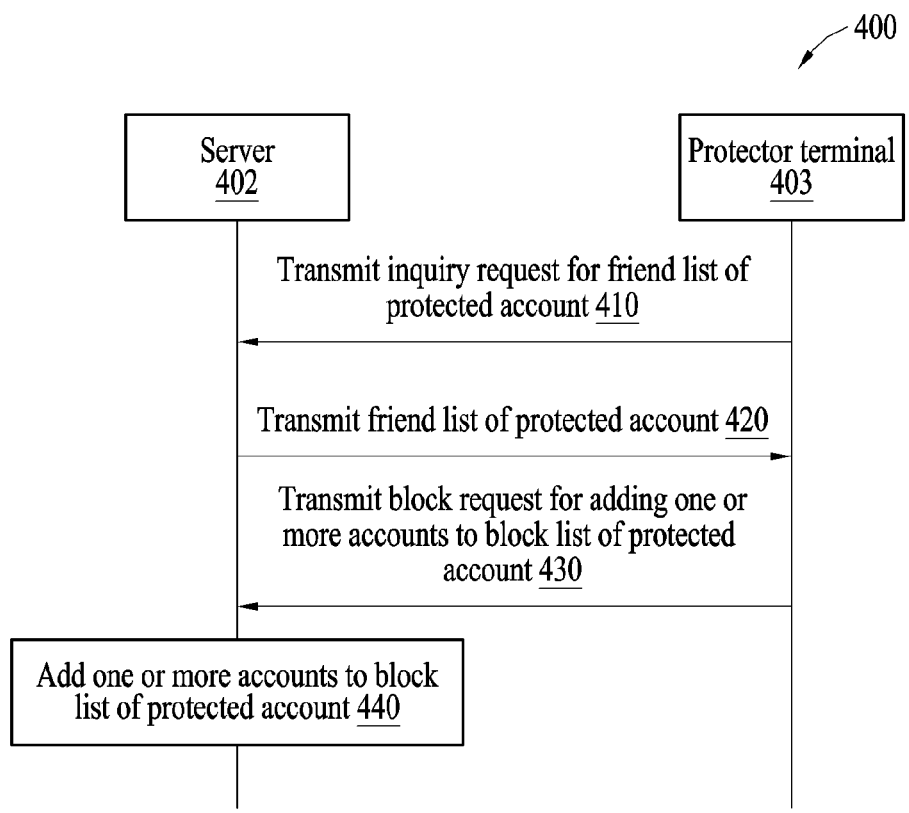
FIG. 4 illustrates an example blocking method for a protected account by a protector according to an embodiment.

FIG. 4 illustrates an example blocking method for a protected account by a protector according to an embodiment.

According to an embodiment, a blocking method 400 for a protected account, performed by a server 402, may include operation 410 of receiving an inquiry request for searching for a friend list of the protected account from a protector terminal 403, operation 420 of transmitting the friend list of the protected account to the protector terminal 403, operation 430 of receiving a block request from the protector terminal 403, and operation 440 of blocking based on the block request.

In operation 410, the protector terminal 403 may transmit an inquiry request for searching for a friend list of a protected account to the server 402. The server 402 may receive the inquiry request for searching for the friend list of the protected account from the protector terminal 403. The inquiry request for the friend list of the protected account may be a request for obtaining the friend list of the protected account.

In operation 420, based on the inquiry request, the server 402 may transmit the friend list of the protected account to the protector terminal 403. The protector terminal 403 may then receive the friend list of the protected account from the server 402.

In operation 430, the protector terminal 403 may transmit a block request for the protected account to the server 402. The server 402 may then receive the block request for the protected account from the protector terminal 403. The block request for the protected account may be a request for adding one or more accounts to a block list of the protected account. For example, the block request for the protected account may include a request for blocking one or more accounts included in the friend list of the protected account.

In operation 440, based on the block request, the server 402 may add one or more accounts for which the block request is made to the block list of the protected account. For example, the server 402 may add one or more accounts indicated by the block request to the block list of the protected account. Therefore, transmitting messages from the accounts added to the block list of the protected account to the protected account via the server 402 may be restricted.

As described above with reference to FIG. 4, through an IMS provided by a server according to an embodiment, a protector may add an account to a block list of a protected account, and thus message transmission from the account included in the block list of the protected account to the protected account may be restricted.

Figure 5:
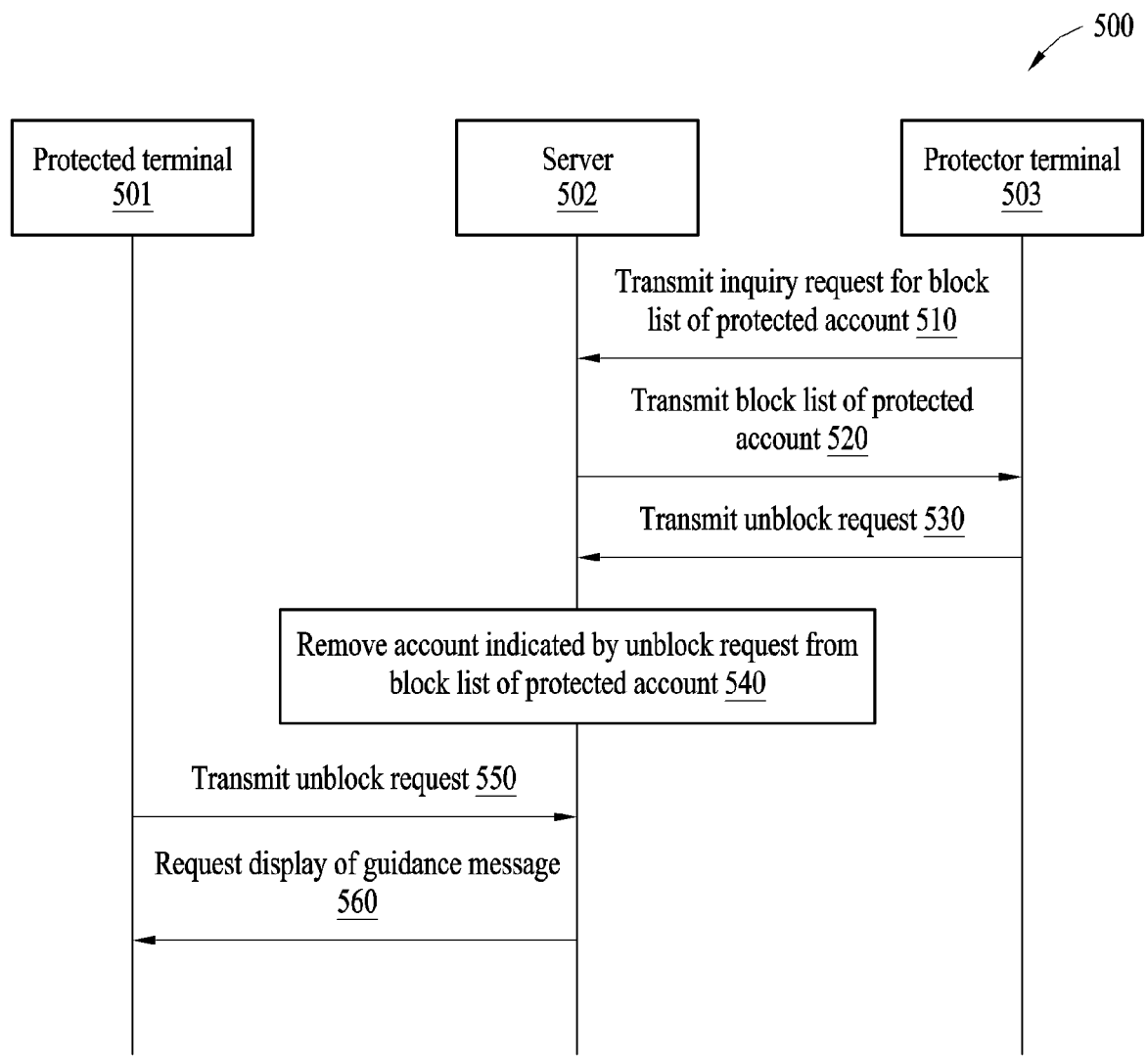
FIG. 5 illustrates an example unblocking method for a protected account according to an embodiment.

FIG. 5 illustrates an example unblocking method for a protected account according to an embodiment.

According to an embodiment, an unblocking method 500 for a protected account, performed by a server 502, may include operation 510 of receiving an inquiry request for searching for a block list of the protected account from a protector terminal 503, operation 520 of transmitting the block list of the protected account to the protector terminal 503, operation 530 of receiving an unblock request from the protector terminal 503, and operation 540 of removing an account from the block list of the protector account based on the unblock request.

In operation 510, the protector terminal 503 may transmit an inquiry request for searching for a block list of a protected account to the server 502. The server 502 may receive the inquiry request for the block list of the protected account from the protector terminal 503. The inquiry request for the block list of the protected account may be a request for obtaining the block list of the protected account.

In operation 520, based on the inquiry request for the block list, the server 502 may transmit the block list of the protected account to the protector terminal 503. The protector terminal 503 may then receive the block list of the protected account from the server 502 based on the inquiry request for the block list.

The server 502 may receive an unblock request from at least one of a protected terminal 501 or the protector terminal 503. The protected terminal 501 may include a terminal accessed with the protected account. The unblock request, which is an unblock request for the protected account, may be a request for removing one or more accounts from the block list of the protected account among accounts included in the block list of the protected account. For example, the unblock request may include a request indicating one or more of the accounts included in the block list of the protected account.

In operation 530, the protector terminal 503 may transmit the unblock request to the server 502. The server 502 may then receive the unblock request from the protector terminal 503.

In operation 540, based on receiving the unblock request from the protector terminal 503, the server 502 may remove an account indicated by the unblock request from the block list of the protected account.

According to an embodiment, the unblocking method for the protected account, performed by the server 502, may include an operation (not shown) of receiving an inquiry request for searching for a block list of the protected account from the protected terminal 501; an operation (not shown) of transmitting the block list of the protected account to the protected terminal 501; operation 550 of receiving an unblock request from the protected terminal 501; and operation 560 of transmitting a guidance message to the protected terminal 501.

The protected terminal 501 may transmit an inquiry request for the block list of the protected account to the server 502. The server 502 may then receive the inquiry request for the block list of the protected account from the protected terminal 501.

Based on the inquiry request for the block list, the server 502 may transmit the block list of the protected account to the protected terminal 501. The protected terminal 501 may then receive the block list of the protected account from the server 502 based on the inquiry request for the block list.

In operation 550, the protected terminal 501 may transmit an unblock request to the server 502. The server 502 may then receive the unblock request from the protected terminal

501. As described above, the unblock request may be a request for removing one or more of accounts included in the block list of the protected account from the block list of the protected account. For example, the unblock request may include a request indicating one or more of the accounts included in the block list of the protected account.

In operation 560, based on receiving the unblock request from the protected terminal 501, the server 502 may request the protected terminal 501 to display a guidance message. The guidance message may include a message indicating that the unblock request cannot be executed.

According to an embodiment, the server 502 may request the protected terminal 501 to display the guidance message indicating that the unblock request cannot be executed. For example, the server 502 may receive the unblock request from the protected terminal 501 and transmit, to the protected terminal 501, information indicating that an account type corresponds to a protected account based on the protected terminal 501 accessing an IMS with the protected account. As the server 502 transmits the information indicating that the account type is a protected account to the protected terminal 501, the server 502 may request the protected terminal 501 to display the guidance message indicating that the unblock request cannot be executed. When receiving the request for displaying the guidance message indicating that the unblock request cannot be executed from the server 502, the protected terminal 501 may display the guidance message indicating that the unblock request cannot be executed. The guidance message may be one that is temporarily and/or permanently stored in the protected terminal 501.

According to an embodiment, the server 502 may transmit the guidance message to the protected terminal 501. The protected terminal 501 may then receive the guidance message from the server 502. The protected terminal 501 may display the guidance message received from the server 502.

It has been described above with reference to FIG. 5 primarily, but not exclusively, that the server 502 requests the display of a guidance message indicating that an unblock request cannot be executed in response to receiving the unblock request from the protected terminal 501. Although not explicitly shown in FIG. 5, based on obtaining an input corresponding to the unblock request, the protected terminal 501 may display the guidance message indicating that the unblock request cannot be executed. For example, based on obtaining the input corresponding to the unblock request, the protected terminal 501 may determine an account type (e.g., a general account, a protected account, etc.) of an account used for accessing the IMS. Based on accessing the IMS with the protected account, the protected terminal 501 may display the guidance message indicating that the unblock request cannot be executed.

As described above with reference to FIG. 5, through an IMS provided by a server according to an embodiment, a protector may unblock an account included in a block list of a protected account, and a protected may not be able to unblock the account included in the block list of the protected account.

Figure 6A:
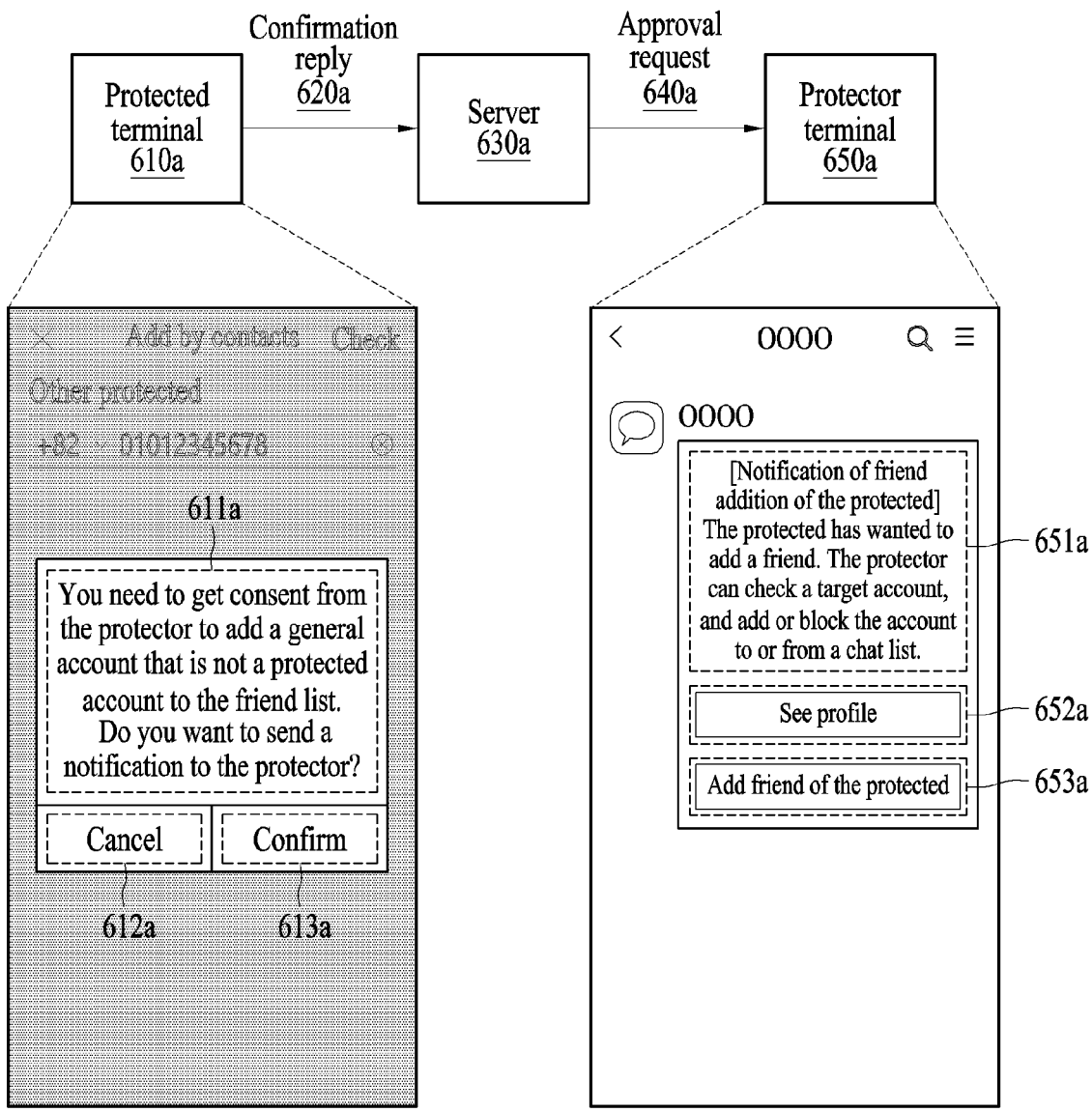
FIG. 6A illustrates an example of a guidance message and an approval request in response to a friend add request for adding a general account to a friend list of a protected account according to an embodiment.
Figure 6B:
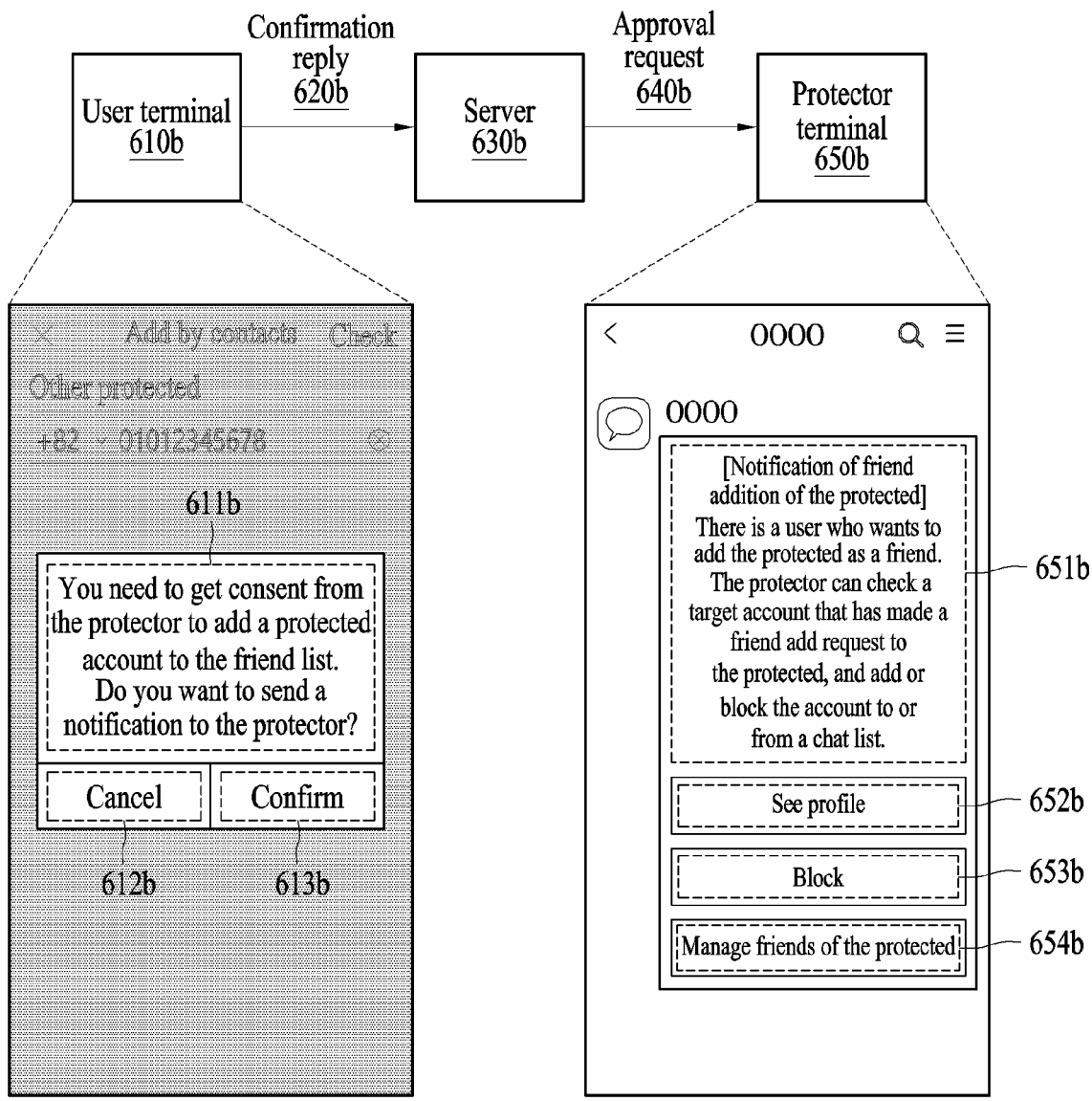
FIG. 6B illustrates an example of a guidance message and an approval request in response to a friend add request for adding a protected account to a friend list of a general account according to an embodiment.

FIG. 6A illustrates an example of a guidance message and an approval request in response to a friend add request for adding a general account to a friend list of a protected account according to an embodiment. FIG. 6B illustrates an example of a guidance message and an approval request in response to a friend add request for adding a protected account to a friend list of a general account according to an embodiment.

According to an embodiment, a user terminal accessed with a user account may transmit a friend add request for a target account to a server. The server may then receive the friend add request for the target account from the user terminal. Based on one of the user account and the target account being a protected account, the server may transmit, to the user terminal, a guidance message about whether to transmit an approval request to a protector terminal. The user terminal may then receive the guidance message from the server. The user terminal may transmit, to the server, a confirmation reply to the guidance message. The server may then receive the confirmation reply to the guidance message from the user terminal. Based on receiving the confirmation reply from the user terminal, the server may transmit an approval request in response to the friend add request to the protector terminal. The protector terminal may then receive, from the server, the approval request in response to the friend add request. Hereinafter, an example guidance message and an example approval request in a case of the user account being a protected account will be described with reference to FIG. 6A, and an example guidance message and an example approval request in a case of the target account being a protected account will be described with reference to FIG. 6B.

As shown in FIG. 6A, in a case of the user account being a protected account, a user terminal may be a protected terminal 610a.

According to an embodiment, the protected terminal 610a may transmit a friend add request for a target account to a server 630a. Based on the user account being a protected account and the target account being a general account that is not a protected account, the server 630a may request the protected terminal 610a to display a guidance message 611a about whether to transmit an approval request to a protector terminal 650a.

For example, based on the user account being a protected account and the target account being a general account that is not protected account, the server 630a may transmit, to the protected terminal 610a, the guidance message 611a about whether to transmit the approval request to the protector terminal 650a. The protected terminal 610a may receive the guidance message 611a from the server 630a.

For another example, the server 630a may transmit, to the protected terminal 610a, information indicating that one of the user account and the target account is a protected account (e.g., information indicating that the user account is a protected account and the target account is a general account that is not a protected account). The protected terminal 610a may then receive, from the server 630a, the information indicating that one of the user account and the target account is a protected account (e.g., the information indicating that the user account is a protected account and the target account is a general account that is not a protected account). Based on receiving, from the server 630a, the information indicating that one of the user account and the target account is a protected account, the protected terminal 610a may display the guidance message 611a.

The protected terminal 610a may provide the guidance message 611a to a protected. For example, the guidance message 611a may include at least one of a message indicating that the target account is a general account that is not a protected account, a message indicating that consent from a protector is required to add a friend, or a message about whether to transmit an approval request to the protector. The protected terminal 610a may provide an area 612a for a cancellation reply and an area 613a for a confirmation reply, along with the guidance message 611a.

The protected terminal 610a may obtain an input (e.g., a touch input) corresponding to the area 612a for a cancellation reply as an input indicating the cancellation reply to the guidance message 611a. The protected terminal 610a may obtain an input (e.g., a touch input) corresponding to the area 613a for a confirmation reply as an input indicating the confirmation reply to the guidance message 611a.

Based on obtaining the input indicating the confirmation reply, the protected terminal 610a may transmit, to the server 630a, the confirmation reply to the guidance message 611a. The server 630a may receive, from the protected terminal 610a, the confirmation reply to the guidance message 611a. The server 630a may transmit an approval request 640a for the friend add request to the protector terminal 650a. The protector terminal 650a may then receive the approval request 640a for the friend add request from the server 630a.

The protector terminal 650a may provide an approval request 651a to the protector. Along with the approval request 651a, the protector terminal 650a may provide an area 652a for an inquiry request for searching for a profile and an area 653a for an approval reply. The protector terminal 650a may obtain an input (e.g., a touch input) corresponding to the area 652a for an inquiry request for a profile as an input indicating the inquiry request for the profile of the target account. The protector terminal 650a may display the approval request 651a in a chat room provided via a chat service of an IMS. For example, the protector terminal 650a may display the approval request 651a as a message via the chat room (e.g., a chat room or a notification talk). For example, the chat room for the approval request 651a may include a chat room corresponding to a corporate account associated with the IMS.

Based on an input (e.g., a touch input) corresponding to the area 653a for an approval reply, the protector terminal 650a may obtain an input indicating an approval reply to the approval request 651a. For example, the protector terminal 650a may obtain an input (e.g., a touch input) corresponding to the area 653a for an approval reply as an input indicating the approval reply to the approval request 651a.

For another example, the protector terminal 650a may obtain an input (e.g., a touch input) corresponding to the area 653a for an approval reply as an input indicating an inquiry request for searching for a friend list of the protected account. The protector terminal 650a may transmit, to the server 630a, the inquiry request for the friend list of the protected account. The server 630a may transmit the friend list of the protected account to the protector terminal 650a. The protector terminal 650a may then receive the friend list of the protected account from the server 630a. The protector terminal 650a may provide the protector with the friend list of the protected account on a search interface (not shown). The protector terminal 650a may provide a friend add interface (not shown) which is changed from the search interface, based on an input obtained from the search interface. The protector terminal 650a may obtain, from the friend add interface, an input indicating the friend add request for adding the target account to the friend list of the protected account. That is, the protector terminal 650a may obtain an input indicating an approval reply including the friend add request. A search interface and a friend add interface of a protector terminal will be described in more detail below with reference to FIG. 7A.

Based on obtaining the input indicating the approval reply, the protector terminal 650a may transmit the approval reply to the server 630a. The server 630a may then receive the approval reply from the protector terminal 650a. Based on receiving the approval reply from the protector terminal 650a, the server 630a may add the target account to the friend list of the user account that is a protected account.

As shown in FIG. 6B, in a case of the target account being a protected account, a user terminal may be a user terminal 610b accessed with a general account.

According to an embodiment, the user terminal 610b may transmit, to a server 630b, a friend add request for the target account. Based on the user account being a general account that is not a protected account and the target account being a protected account, the server 630b may request the user terminal 610b to display a guidance message 611b about whether to transmit an approval request to a protector terminal 650b.

For example, based on the user account being a general account that is not a protected account and the target account being a protected account, the server 630b may transmit, to the user terminal 610b, the guidance message 611b about whether to transmit the approval request to the protector terminal 650b. The user terminal 610b may then receive the guidance message 611b from the server 630b.

For another example, the server 630b may transmit, to the user terminal 610b, information indicating that one of the user account and the target account is a protected account (e.g., information indicating that the user account is a general account that is not a protected account and the target account is a protected account). The user terminal 610b may then receive, from the server 630b, the information indicating that one of the user account and the target account is a protected account (e.g., the information indicating that the user account is a general account that is not a protected account and the target account is a protected account). Based on receiving, from the server 630b, the information indicating that one of the user account and the target account is a protected account, the user terminal 610b may display the guidance message 611b.

The user terminal 610b may provide the guidance message 611b to a user. For example, the guidance message 611b may include at least one of a message indicating that the target account is a protected account, a message indicating that consent from a protector is required to add a friend, or a message about whether to transmit an approval request to the protector. The user terminal 610b may have an area 612b for a cancellation reply and an area 613b for a confirmation reply, along with the guidance message 611b. The user terminal 610b may obtain an input (e.g., a touch input) corresponding to the area 612b for a cancellation reply as an input indicating a cancellation reply to the guidance message 611b. The user terminal 610b may obtain an input (e.g., a touch input) corresponding to the area 613b for a confirmation reply as an input indicating a confirmation reply to the guidance message 611b.

Based on obtaining the input indicating the confirmation reply, the user terminal 610b may transmit the confirmation reply to the guidance message 611b to the server 630b. The server 630b may then receive the confirmation reply to the guidance message 611b from the user terminal 610b. The server 630b may transmit, to the protector terminal 650b, an approval request 640b for the friend add request. The protector terminal 650b may then receive, from the server 630b, the approval request 640b for the friend add request. The protector terminal 650b may display an approval request 651b in a chat room provided via a chat service of an IMS. For example, the protector terminal 650b may display the approval request 651b as a message via the chat room (e.g., a chat room or a notification talk). For example, the chat room for the approval request 651b may include a chat room corresponding to a corporate account associated with the IMS.

The protector terminal 650b may provide the approval request 651b to the protector. Along with the approval request 651b, the protector terminal 650b may provide an area 652b for an inquiry request for a profile, an area 653b for a block reply, and an area 654b for an inquiry request for a friend list of the protected account. The protector terminal 650b may obtain an input (e.g., a touch input) corresponding to the area 652b for an inquiry request for a profile as an input indicating an inquiry request for a profile of the user account.

The protector terminal 650b may obtain an input indicating a block reply to the approval request 651b, based on an input (e.g., a touch input) corresponding to the area 653b for a block reply. For example, the block reply may include a block request for adding the user account to a block list of the protected account.

Based on an input (e.g., a touch input) corresponding to the area 653b for an approval reply, the protector terminal 650b may obtain an input indicating an approval reply to the approval request 651b. For example, the protector terminal 650b may obtain an input (e.g., a touch input) corresponding to the area 653b for an approval reply as the input indicating the approval reply to the approval request 651b.

For another example, the protector terminal 650b may obtain an input (e.g., a touch input) corresponding to the area 653b for an approval reply as an input indicating an inquiry request for the friend list of the protected account. The protector terminal 650b may transmit, to the server 630b, the inquiry request for the friend list of the protected account. The server 630b may transmit the friend list of the protected account to the protector terminal 650b. The protector terminal 650b may then receive the friend list of the protected account from the server 630b. The protector terminal 650b may provide the protector with the friend list of the protected account on a search interface (not shown). The protector terminal 650b may provide a friend add interface (not shown) which is changed from the search interface, based on an input obtained from the search interface. The protector terminal 650b may obtain, from the friend add interface, an input indicating the friend add request for adding the target account to the friend list of the protected account. That is, the protector terminal 650b may obtain an input indicating an approval reply including the friend add request. A search interface and a friend add interface of a protector terminal will be described in more detail below with reference to FIG. 7A.

Based on obtaining the input indicating the approval reply, the protector terminal 650b may transmit the approval reply to the server 630b. The server 630b may then receive the approval reply from the protector terminal 650b. Based on receiving the approval reply from the protector terminal 650b, the server 630b may add the user account to the friend list of the target account that is a protected account and add the target account to the friend list of the user account.

Figure 7A:
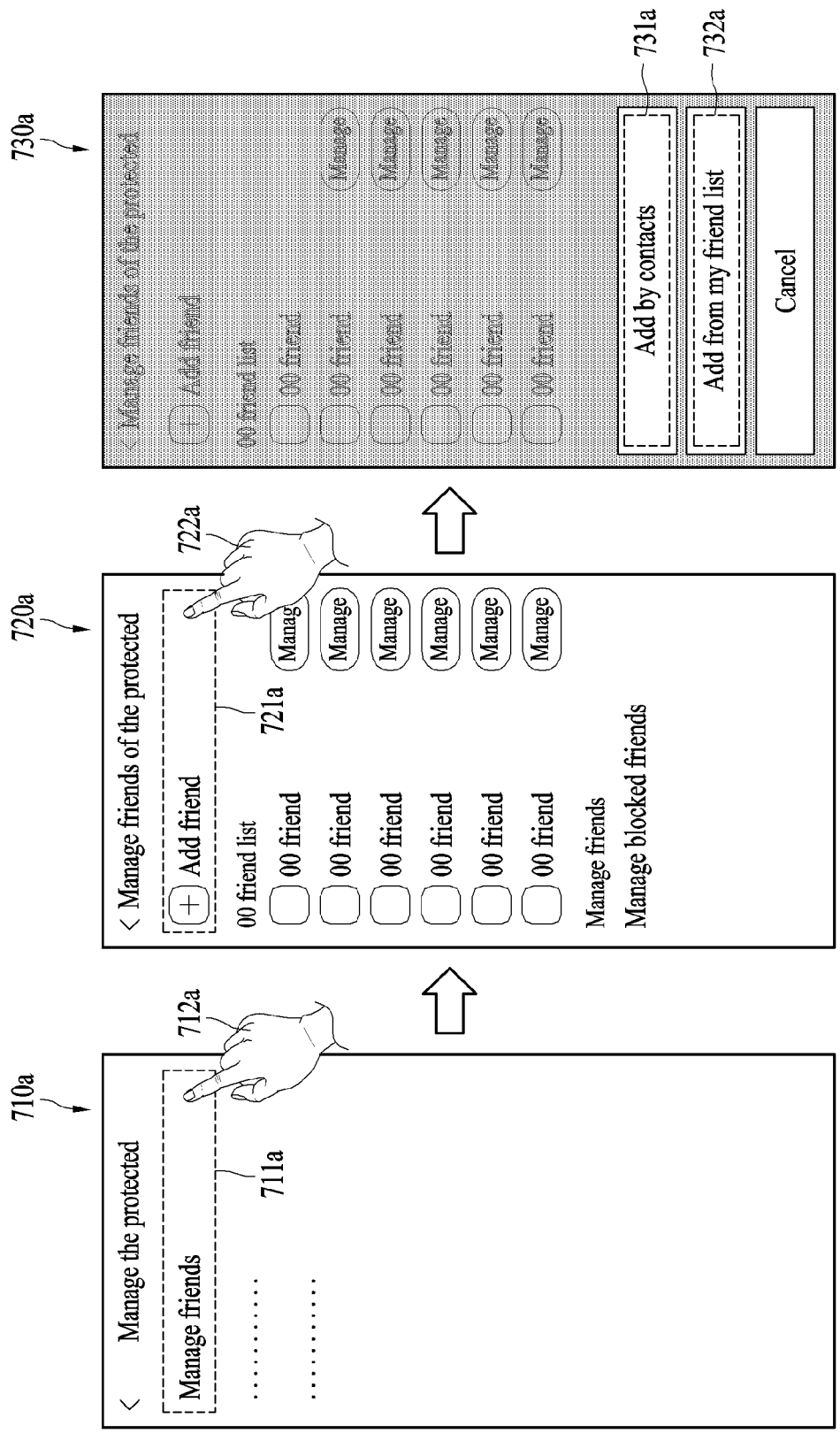
FIG. 7A illustrates an example of searching for a friend list of a protected account and adding a friend by a protector terminal according to an embodiment.
Figure 7B:
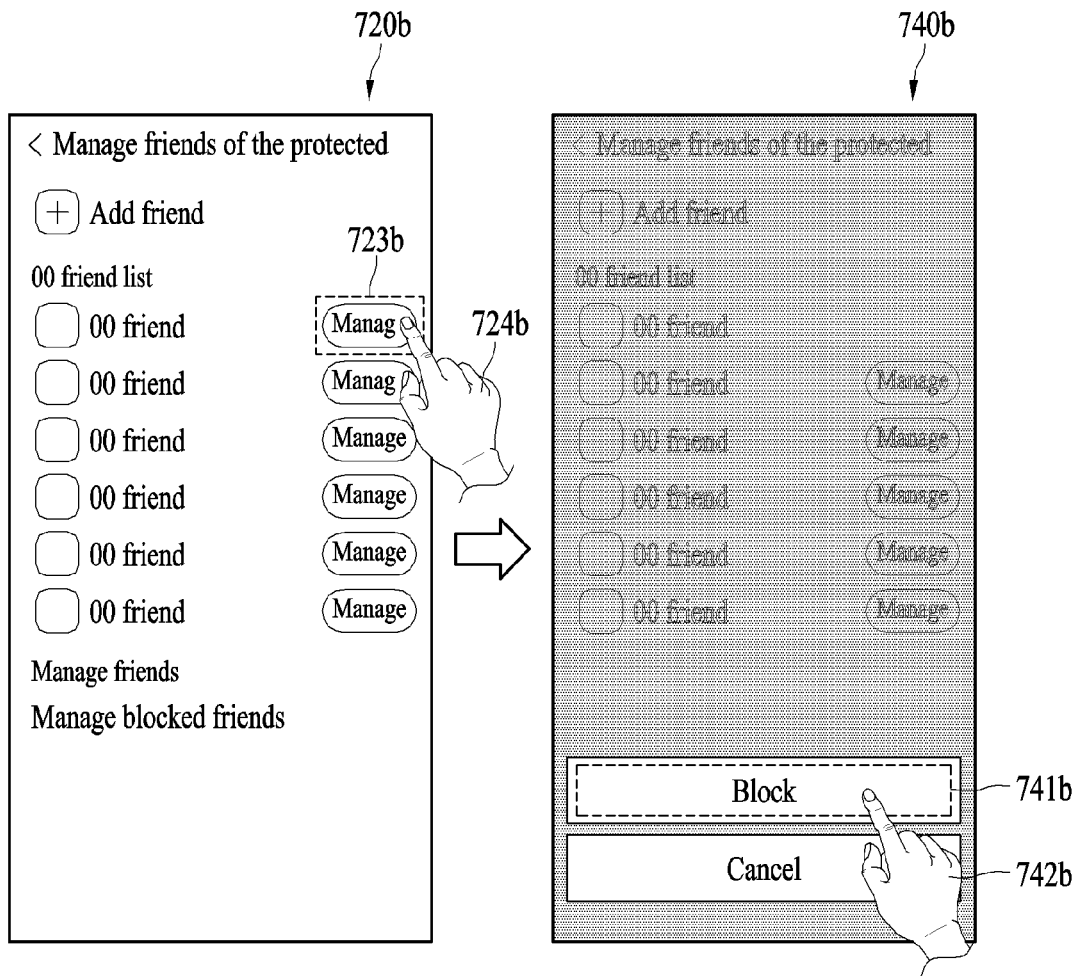
FIG. 7B illustrates an example of blocking a friend of a protected account by a protector terminal according to an embodiment.

FIG. 7A illustrates an example of searching for a friend list of a protected account and adding a friend by a protector terminal according to an embodiment. FIG. 7B illustrates an example of blocking a friend of a protected account by a protector terminal according to an embodiment.

As shown in FIG. 7A, a protector terminal may provide a management interface 710a for managing a protected account. The management interface 710a may be an interface that provides managing functions (e.g., managing friends, managing use time, managing accessible sites, etc.) for the protected account.

Based on an inquiry input 712a from a protector, the protector terminal may provide a search interface 720a that is changed from the management interface 710a. The inquiry input 712a may be an input (e.g., a touch input) that selects a friend manage area 711a from the management interface 710a. The protector terminal may obtain the inquiry input 712a as an input indicating an inquiry request for searching for a friend list of the protected account. The search interface 720a may be an interface for providing the friend list of the protected account to the protector.

Based on a friend add input 722a from the protector, the protector terminal may provide a friend add interface 730a which is changed from the search interface 720a. The friend add input 722a may be an input (e.g., a touch input) that selects a friend add area 721a from the search interface 720a. The friend add interface 730a may be an interface for generating an input indicating a friend add request for the friend list of the protected account. The friend add interface 730a may include an area 731a for adding a friend using contacts information and an area 732a for adding a friend using a friend list of a protector account.

Based on an input to the area 731a for adding a friend using contacts information, the protector terminal may provide a contacts information-based friend add interface (not shown). The contacts information-based friend add interface may include a contacts input window for inputting contacts. The contacts input window may include an area in which contacts information of the target account for the friend add request is to be input.

Based on an input to the area 732a for adding a friend using a friend list of a protector account, the protector terminal may provide a protector account's friend list interface (not shown). The protector account's friend list interface may include an area for the friend list of the protector account. The protector terminal may obtain, from the protector account's friend list interface, an input indicating a friend add request for adding one or more of accounts included in the friend list of the protector account.

As shown in FIG. 7B, based on a block input 724b from a protector, a protector terminal may provide a block interface 740b that is changed from a search interface 720b. The block input 724b may be an input (e.g., a touch input) that selects a block area 723b from the search interface 720b. The block area 723b may correspond to one or more of accounts included in a friend list of a protected account. The block interface 740b may be an interface for generating an input indicating a block request for blocking one or more accounts corresponding to the block area 723b.

Based on an input 742b that selects an area 741b from the block interface 740b, the protector terminal may obtain the input indicating the block request. The block request may be a request for adding one or more accounts indicated by the block request to a block list of the protected account. The one or more accounts indicated by the block request may be one or more accounts corresponding to the block area 723b.

Figure 7C:
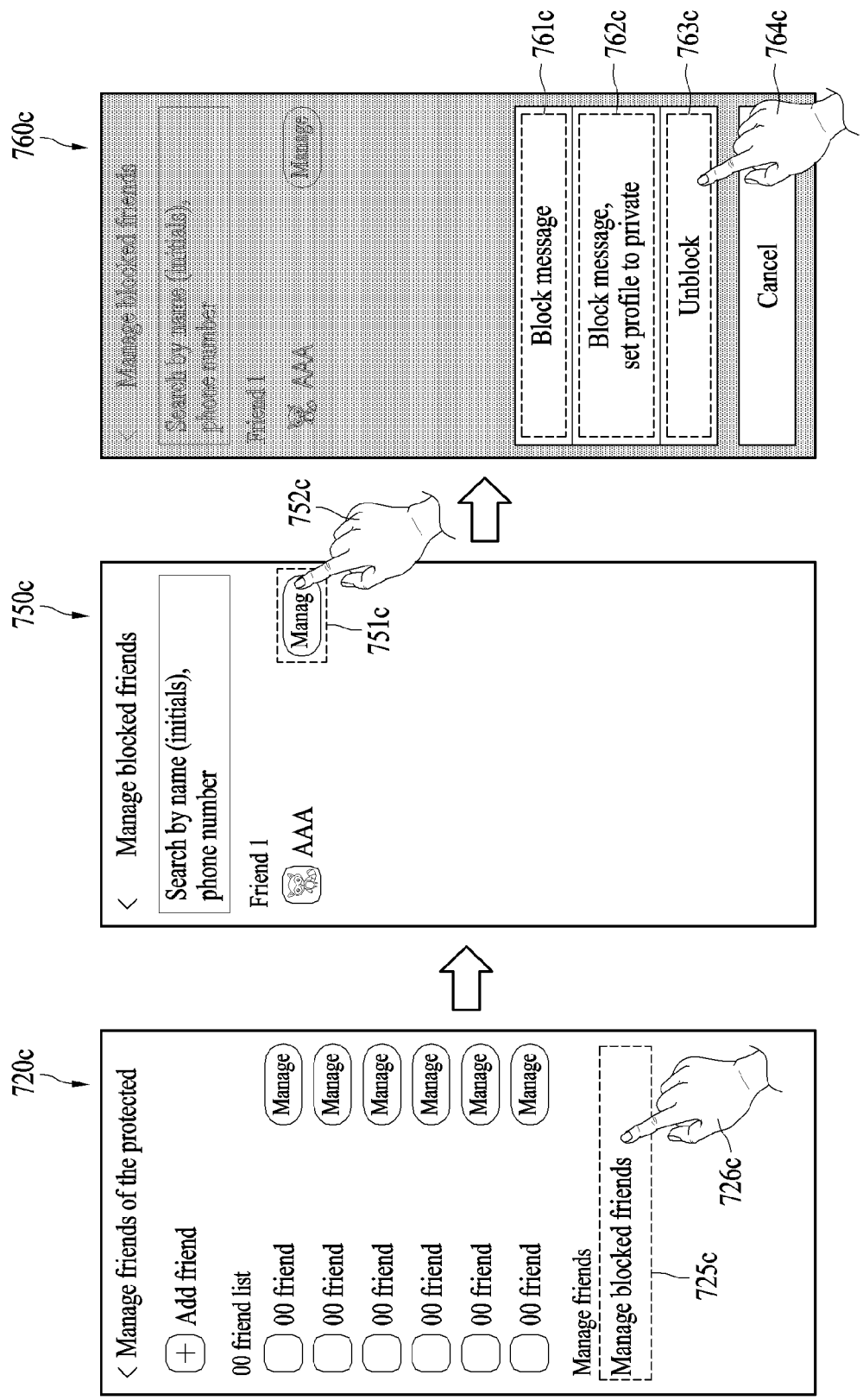
FIG. 7C illustrates an example of searching for a block list and unblocking by a protector terminal according to an embodiment.

As shown in FIG. 7C, based on a block list inquiry input 726c from a protector, a protector terminal may provide a block list search interface 750c that is changed from a search interface 720c. The block list inquiry input 726c may be an input (e.g., a touch input) that selects a blocked friend manage area 725c from the search interface 720c. The protector terminal may obtain the block list inquiry input 726c as an input indicating an inquiry request for searching for a block list of a protected account. The block list search interface 750*c* may be an interface for providing the block list of the protected account to the protector.

Based on a block manage input 752*c* from the protector, the protector terminal may provide a block management interface 760*c* that is changed from the block list search interface 750*c*. The block manage input 752*c* may be an input (e.g., a touch input) that selects an unblock area 751*c* from the block list search interface 750*c*. The unblock area 751*c* may correspond to one or more of accounts included in the block list of the protected account. The block management interface 760*c* may be an interface for managing accounts included in the block list of the protected account corresponding to the unblock area 751*c*. The block management interface 760*c* may include an area 761*c* for a message block request for blocking messages from corresponding accounts, an area 762*c* for a request for blocking messages from corresponding accounts and setting a profile to private, and an area 763*c* for an unblock request.

The protector terminal may obtain an input 764*c* that selects the area 763*c* as an input indicating an unblock request. The unblock request may include a request for unblocking one or more accounts included in the block list of the protected account. That is, the unblock request may include a request for removing an account indicated by the unblock request from the block list of the protected account. The account indicated by the unblock request may be one or more accounts corresponding to the block manage input 752*c*.

Hereinafter, a block setting request that may be made via the area 761*c* for a message block request and the area 762*c* for a request for blocking messages and setting a profile to private will be described.

An account included in a block list may be set to any one of "block messages" and "block messages and set a profile to private." An account set to "block messages" may be restricted to transmit a message to a protected account via a server. However, the account set to "block messages" may not be restricted to view (or search for) a profile of the protected account. For example, the server may provide the profile of the protected account to the account set to "block messages." In contrast, an account set to "block messages and set a profile to private" may be restricted to transmit a message to the protected account via the server and may also be restricted to view the profile of the protected account.

A protector terminal may transmit, to the server, a block setting request for setting one or more accounts included in the block list to one of "block messages" and "block message and set a profile to private." The block setting request may include a "message block request" for blocking messages and a "message block and private profile set request" for blocking messages and setting a profile to private. The message block request may include a request to block messages to the protected account from one or more accounts included in the block list of the protected account. Unlike the message block and private profile set request to be described below, the message block request may include a request to allow one or more accounts included in the block list of the protected account to view the profile of the protected account. In contrast, the message block and private profile set request may include a request to restrict one or more accounts included in the block list of the protected account to view the profile of the protected account, in addition to blocking messages from the one or more accounts.

Based on detecting an input (e.g., a touch input) in the area 761*c*, the protector terminal may obtain an input indicating the message block request. Based on obtaining the input indicating the message block request, the protector terminal may transmit the message block request to the server. Based on receiving the message block request from the protector terminal, the server may set one or more accounts indicated by the message block request to "block messages." A terminal accessed with an account that is set to "block messages" may transmit, to the server, a message transmit request for transmitting a message to the protected account. In this case, based on receiving a message transmit request for transmitting a message to the protected account from another account that is included in the block list of the protected account and is set to "block messages," the server may request the protected terminal to restrict the display of the message from the other account.

For example, the server may restrict the transmitting of messages to the protected terminal from another account that is included in the block list of the protected account and is set to "block messages." For example, in a case in which the message transmit request is a request to transmit a message to the protected account from another account that is included in the block list of the protected account and is set to "block messages," the server may not transmit the message to the protected terminal.

For another example, the server may transmit, to the protected terminal, information indicating that another account is included in the block list of the protected account and is set to "block messages." When receiving, from the server, the information indicating that the other account is included in the block list of the protected account and is set to "block messages," the protected terminal may restrict the display of a message from the other account. For example, when receiving, from the server, the information indicating that the other account is included in the block list of the protected account and is set to "block messages," the protected terminal may not display the message.

A terminal accessed with an account set to "block messages" may transmit, to the server, an inquiry request for searching for the profile of the protected account. When receiving the inquiry request for the profile of the protected account from the terminal accessed with the account set to "block messages," the server may transmit the profile of the protected account to the terminal. The terminal accessed with the account set to "block messages" may display the profile of the protected account.

Based on detecting an input (e.g., a touch input) in the area 762*c*, the protector terminal may obtain an input indicating the message block and private profile set request. Based on obtaining the input indicating the message block and private profile set request, the protector terminal may transmit, to the server, the message block and private profile set request. The server may then receive, from the protector terminal, the message block and private profile set request. When receiving, from the protector terminal, the message block and private profile set request, the server may set one or more accounts indicated by the message block and private profile set request to "block messages and set a profile to private." A terminal accessed with an account set to "block messages and set a profile to private" may transmit, to the server, a message transmit request for transmitting a message to the protected account. When receiving the message transmit request for transmitting a message to the protected account from another account that is included in the block list of the protected account and is set to "block messages and set a profile to private," the server may request the protected terminal to restrict the display of the message from the other account.

For example, the server may restrict the transmission of a message from another account that is included in the block list of the protected account and is set to "block messages and set a profile to private" to the protected terminal. For example, when the message transmit request is a request for transmitting a message to the protected account from another account that is included in the block list of the protected account and is set to "block messages and set a profile to private," the server may not transmit the message to the protected terminal.

For another example, the server may transmit, to the protected terminal, information indicating that another account is included in the block list of the protected account and is set to "block messages and set a profile to private." When receiving, from the server, the information indicating that the other account is included in the block list of the protected account and is set to "block messages and set a profile to private," the protected terminal may restrict the display of the message from the other account. For example, when receiving, from the server, the information indicating that the other account is included in the block list of the protected account and is set to "block messages and set a profile to private," the protected terminal may not display the message.

A terminal accessed with an account set to "block messages and set a profile to private" may transmit, to the server, an inquiry request for searching for the profile of the protected account. When receiving the inquiry request for the profile of the protected account from the terminal accessed with the account set to "block messages and set a profile to private," the server may request the terminal to restrict the display of the profile of the protected account.

For example, when receiving the inquiry request for the profile of the protected account from another account that is included in the block list of the protected account and is set to "block messages and set a profile to private," the server may restrict the transmission of the profile of the protected account to the other account. For example, the server may not transmit the profile of the protected account to the other account that is included in the block list of the protected account and is set to "block messages and set a profile to private."

For another example, the server may transmit, to another account, information indicating that the other account is included in the block list of the protected account and is set to "block messages and set a profile to private." In this example, based on receiving, from the server, the information indicating that the other account is included in the block list of the protected account and is set to "block messages and set a profile to private," a terminal accessed with the other account may restrict the display of the profile of the protected account. For example, the terminal accessed with the other account that is included in the block list of the protected account and is set to "block messages and set a profile to private" may not display the profile of the protected account.

The terminal accessed with the other account that is included in the block list of the protected account and is set to "block messages and set a profile to private" may display a default profile instead of the profile of the protected account.

Figure 8:
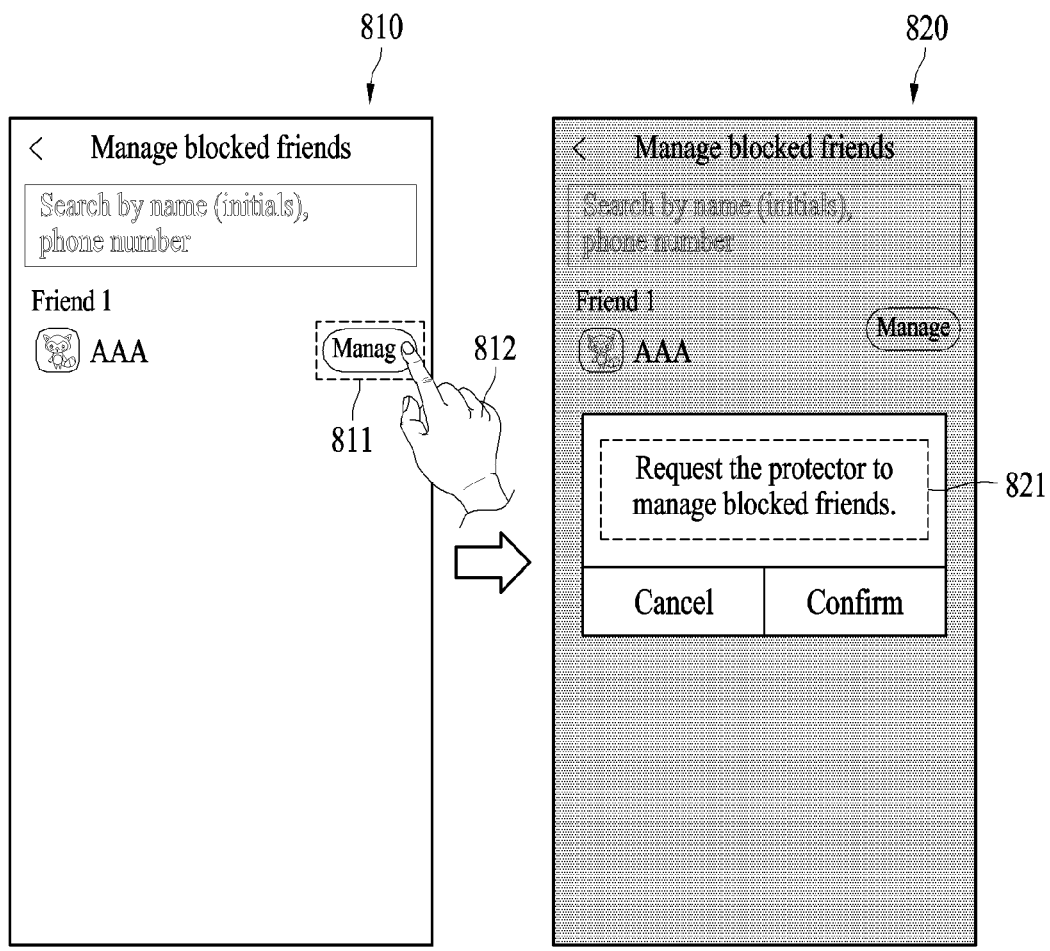
FIG. 8 illustrates an example of searching for a block list of a protected terminal and an example guidance message about disapproving an unblock according to an embodiment.

FIG. 8 illustrates an example of searching for a block list of a protected terminal and an example guidance message about disapproving an unblock according to an embodiment.

As shown in FIG. 8, a protected terminal may provide a block list search interface 810 for searching for a block list of a protected account. The block list search interface 810 may be an interface for providing the block list of the protected account to a protected.

Based on a block manage input 812 from a protector, the protected terminal may provide a guidance message interface 820 that is changed from the block list search interface 810. The block manage input 812 may be an input (e.g., a touch input) that selects a block manage area 811 from the block list search interface 810. The block manage area 811 may correspond to one or more of accounts included in the block list of the protected account. The guidance message interface 820 may include a guidance message 821 indicating that an unblock request cannot be executed. The guidance message 821 may include a message that recommends making a request to the protector.

According to an embodiment, a server may include a communicator, a memory, and a processor.

The processor may receive a friend add request for a target account from a user terminal via the communicator. The processor may determine whether one of the user account and the target account is a protected account. The processor may determine whether the user account is comprised in one of a friend list and a block list of the target account. The processor may transmit a guidance message to the user terminal via the communicator. The processor may receive a reply to the guidance message from the user terminal via the communicator. The processor may transmit an approval request to a protector terminal via the communicator. The processor may receive a reply to the approval request from the protector terminal via the communicator. The processor may add the target account to the friend list of the user account.

The processor may receive a request for a friend list and/or a block list of the protected account from the protector terminal via the communicator. The processor may transmit the friend list and/or the block list of the protected account to the protector terminal via the communicator. Based on the request received from the protector terminal, the processor may add and/or remove the target account corresponding to the request to and/or from one of the friend list and the block list of the protected account.

According to an embodiment, a protector terminal may include a communicator, a memory, a display, and a processor. The processor may receive an approval request for a friend add request from a server via the communicator. The processor may transmit a reply to the approval request to the server via the communicator. The memory may store therein information about a protector account, information about a protected account connected to the protector account, information about a friend list and a block list of the protector account, and/or information about a friend list and a block list of the protected account. The display, which may be implemented as a touch display, for example, may receive an input associated with a request for the friend list and the block list of the protected account, and/or visually output information associated with requests and/or guidance messages.

The operations of each component of the server and the protector terminal are not limited to the foregoing, and the description of the operations provided above with reference to FIGS. 1 to 8 may also be applied to the server and a protector terminal.

The example embodiments described herein may be implemented using hardware components, software components, and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as, parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An operation method of a server, comprising:
   receiving a friend add request for a target account from a user terminal accessed with a user account;
   based on the target account being a protected account and the user account is a general account, determining whether the user account is being included in each of a friend list and a block list of the target account;
   in response to the user account not being included in either the friend list or the block list of the target account,
   transmitting an approval request for the friend add request to a protector account connected to the protected account;
   in response to determination that the user account is comprised in a block list of the target account, and in response to receiving an unblock request from a protector terminal accessed with the protector account, removing the user account indicated by the unblock request from the block list of the target account;
   receiving an approval reply to the approval request from the protector terminal; and
   based on receiving the approval reply to the approval request from the protector terminal accessed with the protector account, adding the target account to a friend list of the user account,
   in response to the user account being included in one of the friend list or the block list of the target account, omitting transmission of the approval request;
   adding the target account to the friend list of the user account without approval from the protector account.

2. The operation method of claim 1, wherein the transmitting of the approval request comprises:
   based on one of the user account and the target account being a protected account and the other being a general account, transmitting the approval request.

3. The operation method of claim 1, wherein the transmitting of the approval request comprises:
   requesting the user terminal to display a guidance message about transmission of the approval request to the protector account; and
   based on receiving a confirmation reply to the guidance message from the user terminal, transmitting the approval request to the protector account.

4. The operation method of claim 1, further comprising:
   based on one of the user account and the target account being a protected account and the other being a general account, receiving, from the protector terminal, an inquiry request for searching for a profile of the other account set by the other account; and
   based on the received inquiry request for the profile, transmitting the profile of the other account to the protector terminal.

5. The operation method of claim 1, wherein the transmitting of the approval request comprises:
   based on the user account being a protected account, transmitting the approval request to a protector account connected to the user account.

6. The operation method of claim 1, wherein the adding of the target account comprises:

based on the target account being a protected account, adding the user account to the friend list of the target account.

7. The operation method of claim 1, further comprising:
based on the target account being a protected account and based on receiving a block reply to the approval request from the protector terminal, adding the user account to a block list of the target account.

8. The operation method of claim 1, further comprising:
based on the user account and the target account being both a protected account, adding the target account to the friend list of the user account without approval for the friend add request.

9. The operation method of claim 1, further comprising:
receiving an inquiry request for searching for the friend list of the protected account from the protector terminal; and
based on the inquiry request for the friend list, transmitting the friend list of the protected account to the protector terminal.

10. The operation method of claim 1, further comprising:
receiving, from the protector terminal, a friend add request for adding another account to the friend list of the protected account; and
based on the friend add request for the other account, adding the other account to the friend list of the protected account.

11. The operation method of claim 1, further comprising:
receiving, from the protector terminal, a block request for blocking one or more accounts among accounts comprised in the friend list of the protected account; and
adding the one or more accounts indicated by the block request to a block list of the protected account.

12. The operation method of claim 1, further comprising:
receiving, from the protector terminal, an inquiry request for searching for a block list of the protected account; and
based on the inquiry request for the block list, transmitting the block list of the protected account to the protector terminal.

13. An operation method of a protector terminal accessed with a protector account, the operation method comprising:
receiving, from a server receiving a friend add request for a target account from a user terminal accessed with a user account, an approval request for the friend add request, based on the target account being a protected account and the user account not being included in each of a friend list or a block list of the target account;
transmitting a reply to the approval request to the server; and
in response to determination that the user account is comprised in the block list of the target account, and in response to an unblock request being transmitted from the protector terminal, receiving from the server a notification that the user account indicated by the unblock request has been removed from the block list of the target account.

14. The operation method of claim 13, further comprising:
based on one of the user account and the target account being a protected account and the other being a general account, transmitting, to the server, an inquiry request for searching for a profile of the other account set by the other account; and
displaying the profile of the other account received from the server.

15. The operation method of claim 13, wherein the transmitting of the reply to the approval request to the server comprises:
based on obtaining an input corresponding to an approval reply to the approval request, transmitting the approval reply to the server to request adding the target account to a friend list of the user account.

16. The operation method of claim 13, wherein the transmitting of the reply to the approval request to the server comprises:
based on the target account being a protected account and based on obtaining an input corresponding to a block reply to the approval request, transmitting the block reply to the server to request adding the user account to a block list of the target account.

17. A server comprising:
a hardware processor configured to: receive a friend add request for a target account from a user terminal accessed with a user account; based on one of the user account and the target account being a protected account, transmit an approval request for the friend add request to a protector account connected to the protected account; and based on receiving an approval reply to the approval request from a protector terminal accessed with the protector account, add the target account to a friend list of the user account;
receive an unblock request from at least one of a protected terminal accessed with the protected account or the protector terminal; and
based on receiving the unblock request from the protector terminal, remove an account indicated by the unblock request from a block list of the protected account,
wherein the transmitting of the approval request comprises:
based on the target account being a protected account and the user account being comprised in one of a friend list and a block list of the target account, omit the transmitting of the approval request,
wherein the hardware processor is further configured to:
add the target account to the friend list of the user account without approval from the protector account.

* * * * *